(12) United States Patent
Zhang et al.

(10) Patent No.: US 11,297,846 B2
(45) Date of Patent: Apr. 12, 2022

(54) MULTIDIMENSIONAL ECOLOGICAL PRESERVATION TECHNOLOGY FOR SWEET POTATOES

(71) Applicants: SDIC ZHONGLU FRUIT JUICE CO., LTD., Beijing (CN); RUSHAN ZHONGCHENG FRUIT JUICE BEVERAGE CO., LTD, Weihai (CN)

(72) Inventors: Jiming Zhang, Beijing (CN); Chuanzhu Leng, Beijing (CN); Gang Xin, Beijing (CN); Nan Jiang, Beijing (CN); Xinfei Song, Beijing (CN); Jing Jin, Weihai (CN); Xiangyang Zheng, Weihai (CN); Sixin Wang, Beijing (CN); Baoshuang Tian, Beijing (CN); Chongxiao Shao, Beijing (CN); Yanfang Pan, Beijing (CN); Xihong Li, Beijing (CN); Xiaotong Chen, Beijing (CN)

(73) Assignees: SDIC ZHONGLU FRUIT JUICE CO., LTD., Beijing (CN); RUSHAN ZHONGCHENG FRUIT JUICE BEVERAGE CO., LTD., Weihai (CN)

( * ) Notice: Subject to any disclaimer, the term of this patent is extended or adjusted under 35 U.S.C. 154(b) by 19 days.

(21) Appl. No.: 16/858,626

(22) Filed: Apr. 25, 2020

(65) Prior Publication Data
US 2021/0022358 A1 Jan. 28, 2021

(30) Foreign Application Priority Data
Jul. 26, 2019 (CN) .......................... 201910682453.X

(51) Int. Cl.
*A23B 7/015* (2006.01)
*A23B 7/16* (2006.01)
(Continued)

(52) U.S. Cl.
CPC .............. *A23B 7/015* (2013.01); *A23B 7/153* (2013.01); *A23B 7/16* (2013.01); *A23L 19/105* (2016.08)

(58) Field of Classification Search
CPC .. A23B 7/00; A23B 7/015; A23B 7/14; A23B 7/153; A23B 7/157; A23B 7/159;
(Continued)

(56) References Cited

U.S. PATENT DOCUMENTS 354,184 A * 12/1886 Davis ..................... A23B 7/157
426/333
6,630,187 B1 10/2003 Massengill et al.
(Continued)

FOREIGN PATENT DOCUMENTS

CN 1456099 A * 11/2003
CN 104206516 A 12/2014
(Continued)

*Primary Examiner* — Drew E Becker
*Assistant Examiner* — Austin Parker Taylor

(57) ABSTRACT

The present invention relates to a multidimensional ecological preservation technology for sweet potatoes, including the following steps: collecting mature tuberous roots in proper time; and performing BTH soak cleaning to promote callus, and performing callus treatment as follows: pretreatment before storage, disinfection in a cellar, sand storage, tent air conditioning, and performing secondary cobalt ray irradiation at an irradiation dose of 0.1-0.5 kGy before the end of storage and marketing, thereby achieving dual guarantee of storage period and shelf life. In the present invention, the traditional sand is replaced with a sandy material (having a particle size of 1-3 mm), and the sandy material is lightweight, breathable, and high in water absorbing and retaining property, thermal insulation and heat preservation.

4 Claims, 1 Drawing Sheet

(51) Int. Cl.
*A23L 19/10* (2016.01)
*A23B 7/153* (2006.01)

(58) Field of Classification Search
CPC ... A23B 7/16; A23L 3/005; A23L 3/26; A23L 3/263; A23L 3/34; A23L 3/3409; A23L 3/358; A23L 3/3598; A23L 3/54; A23L 19/10–12; A23L 3/3454; A23L 3/3589; Y02P 60/85
USPC .................................. 426/310, 398, 418, 419
See application file for complete search history.

(56) References Cited

U.S. PATENT DOCUMENTS

| | | | |
|---|---|---|---|
| 2012/0028328 A1* | 2/2012 | Ramsey | A23B 7/16 435/174 |
| 2016/0324173 A1 | 11/2016 | Rojas Grau et al. | |
| 2018/0049447 A1 | 2/2018 | Watanabe | |

FOREIGN PATENT DOCUMENTS

| | | | | | |
|---|---|---|---|---|---|
| CN | 107371689 | A | * | 11/2017 | |
| CN | 107667679 | A | * | 2/2018 | |
| CN | 108850134 | A | * | 11/2018 | |
| CN | 109042852 | A | * | 12/2018 | |
| CN | 109258791 | A | * | 1/2019 | |
| CN | 109618679 | A | * | 4/2019 | |
| CN | 109953113 | A | * | 7/2019 | |
| CN | 110012938 | A | | 7/2019 | |
| KR | 101815831 | B1 | * | 1/2018 | |
| WO | WO-02060280 | A2 | * | 8/2002 | ............... A23B 4/20 |

\* cited by examiner

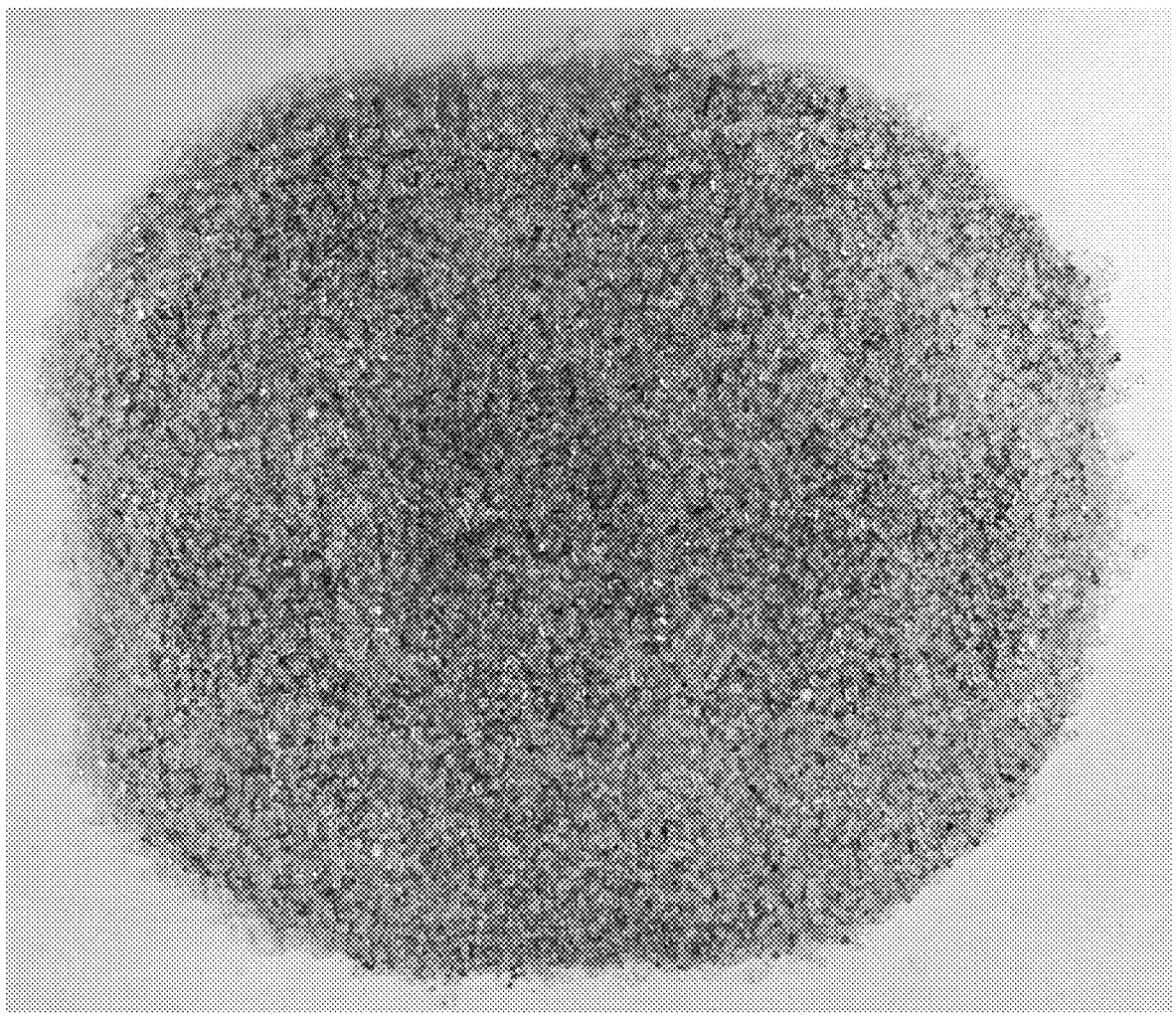

MULTIDIMENSIONAL ECOLOGICAL PRESERVATION TECHNOLOGY FOR SWEET POTATOES

CROSS-REFERENCE TO RELATED APPLICATIONS

This application claims priority to Chinese Patent Application No. 201910682453.X with a filing date of Jul. 26, 2019. The content, of the aforementioned applications, including any intervening amendments thereto, are incorporated herein by reference.

TECHNICAL FIELD

The present invention belongs to the technical field of preservation, and particularly relates to a multidimensional ecological preservation technology for sweet potatoes.

BACKGROUND OF THE PRESENT INVENTION

After sweet potatoes are harvested, in order to stagger time to market so as to sell for a good price, or to make preparations for seedling growing in the coming year, the sweet potatoes are stored. At present, a general sweet potato storage method is cellar storage, because the cellar may realize thermal insulation and antifreeze by utilizing underground heat and respiratory heat of the sweet potatoes, and is relatively safe. However, when the sweet potatoes are stored by some farmers, the sweet potatoes often rot. Actually, reasons that the stored sweet potatoes rot are mainly as follows:

Problem 1: mechanical damage is easily caused to potato skin in a process of harvesting the sweet potatoes, and due to resistance reduction, pathogen infections (such as black spot, soft rot, nematodosis, and the like) and wound respiration of potato pieces (potato pieces subjected to mechanical damage are next to the wound, which indicates that cellular respiratory intensity is doubled within 20 hours, and then continues to a long period) may be caused.

Problem 2: conventional sand storage is poor in breathability (fast temperature rise in piles, and anaerobic respiration), and poor in water-retaining property (weight loss of potato pieces in the middle and later periods of storage); soil microorganisms are attached (moulds grow and potato pieces rot); and sterilization and disinfection processes are complicated.

Problem 3: the sweet potatoes have no physiological dormancy; and from an initial stage of storage to cellar entry (within 30 days after entry), the sweet potatoes easily sprout due to hot and humid conditions in the cellar, moulds easily grow to cause rot of the sweet potatoes, and hollowness of the sweet potatoes is caused by exuberant breathing and excessive nutrient consumption.

Problem 4: from a middle storage stage of sweet potatoes to overwintering (within 30 days after entry-before the following spring), due to reduced breathing, less heat and lower external temperature, the sweet potatoes are at a temperature of 12° C. or lower for a long time, metabolism is retarded, and the sweet potatoes rot in the cellar due to cold; and from a later storage stage to the beginning of spring, oxygen lacks after the cellar is sealed in winter, and anaerobic respiration is easily caused to make the sweet potatoes rot in the cellar.

Problem 5: for cellaring sterilization and disinfection of sweet potatoes, measures such as sulfur fumigation, carbendazim spray and the like are generally taken, fumigation time is long, and hidden safety concerns may exist.

According to the search, the following, patent literatures related to the present application are disclosed and evaluated as follows.

(1) for ZL03121128.3 Chestnut Membrane Tent Sand Storage Preservation Method authorized on May 31, 2006, the traditional sand storage technology is improved in the patent. The patent includes matched technical solutions such as real-time collecting, stacking and sweating; fruit soaking pretreatment before storage; preservation with preservatives; layered piled storage by river sand, and the like. The rotting, rate of chestnuts in the storage period is greatly decreased at room temperature.

Authorization reasons: (1) by virtue of an external cooling water circulation system, respiratory heat of the chestnuts is taken out of sand piles in proper time so as to lower the temperature in the sand piles, decrease respiration intensity of the chestnuts and avoid problems of sprouting under hot and humid conditions, mildew and rot, hollowness and the like at the initial stage of storage; and (2) in the middle and later periods, humidity and air-conditioning concentration are maintained due to self-regulation of PE films, and the rotten fruit rate and weight loss ratio are obviously decreased.

Disadvantages: (1) sand used in the patent needs to be sterilized and disinfected in advance, a medium cooling device is matched, and the process is complicated; and (2) medium sand particles are small, permeability and water-retaining property are poor, and anaerobic respiration rot, dry rot and other conditions are easily caused.

(2) For ZL 201310424246.7 Method for Storing Seed Sweet Potatoes authorized on Jun. 3, 2015, sweet potatoes are packaged by non-woven bags in the patent, stored in a manner of stacking on alternate layers of paper scraps or straws, and turned and checked periodically, thereby realizing safe storage of the seed sweet potatoes.

Authorization reasons: (1) when the sweet potatoes are packaged by shopping bags and peripheries of the sweet potatoes are filled with the paper scraps or straws for storage, excellent thermal insulating, breathing and water, retaining effects are provided, and the seed rot rate is low; and (2) in the whole storage period, the seeds need to be turned and checked within 20-25 days and then are stored in, the same manner, any other management operation is not needed, the method is simple and time- and labor-saving, the potato pieces are fresh, and a storage effect is good.

Disadvantages: (1) in the initial stage of storage, respiratory metabolism of the sweet potatoes is still active, the sweet potatoes easily sprout to consume nutrition, and rot of the sweet potatoes is easily caused due to high temperature and easy growth of moulds; (2) in the patent, although the sweet potatoes are subjected to insulation treatment by utilizing the straws, the sweet potatoes are stored in winter, if condition control is improper and the temperature remains lower than 10° C. for a long time, the sweet potatoes easily suffer from cool damage and even freezing damage; and (3) sweet potato storage boxes are made of paper or wood, and fillers are tight and poor in ventilation, concentrations of $O_2$ and $CO_2$ are unbalanced, and the potato pieces easily produce alcoholic taste and rot due to anaerobic respiration.

For ZL201010254474.0 Low-temperature-resistant Sweet Potato Storage Cellar and Applications on Dec. 28, 2011, the traditional cellar is in organic combination with a greenhouse cellar in the patent. The patent is low in cost and easy to operate and is applicable to large-scale storage and popularization of sweet potatoes.

Authorization reasons: (1) the improved low-temperature-resistant sweet potato storage cellar in the patent overcomes defects that the cellar is poor in thermal insulation property, high in humidity and difficult in air ventilation, and reserves advantages that the traditional greenhouse cellar is convenient in temperature and humidity control and excellent in thermal insulation property; and (2) the storage cellar used in the patent may regulate a humidity environment according to sweet potato varieties, thereby preventing diseases such as soft rot.

Disadvantages: (1) cellar disinfection adopts sulfur fumigation for 22-26 hours, disinfection time is long, and residual safety risk is high; (2) during pretreatment, the sweet potatoes are aired for 3-4 hours on the day of harvest so as to remove field heat, but the sweet potatoes are not subjected to 'sweating' treatment before entering the cellar, so that wet damage of the sweet potatoes after sweating is easily caused at the initial stage of storage, thereby causing physiological wither, reduction of disease resistance and hollowness, and (3) a gaseous environment of sweet potato storage cannot be regulated in the method, and when content of $O_2$ is less than 7% and content of $CO_2$ is more than 10% in the middle and later periods of cellar storage, the sweet potatoes may produce anaerobic respiration or high carbon dioxide poisoning.

According to defects in the prior art and related patents, the present application performs targeted research and development and obtains a sweet potato preservation method with a better effect.

SUMMARY OF PRESENT INVENTION

A purpose of the present invention is to overcome defects in the prior art, and provide a multidimensional ecological preservation technology for sweet potatoes with excellent preservation performance, light weight, breathability and high water absorbing and retaining properties.

The present invention solves the technical problems by adopting technical solutions as follows:

A multidimensional ecological preservation technology for sweet potatoes includes the following raw material components in percentage by mass:

| | |
|---|---|
| modified diatomite | 30%-60% |
| modified expanded perlite | 30%-60% |
| polymerizer-acrylic acid | 3%-5% |
| initiator | 1%-3% |
| cross-linking agent | 1%-3% |
| dispersing agent | 0.1%-2% |

Moreover, the initiator is potassium persulfate; the cross-linking agent is polyacrylamide; and the dispersing agent is polyvinyl alcohol.

Moreover, a preparation method of the modified diatomite includes the following steps: weighing diatomite in a container, treating the container under microwave power of 300-320 W for 10-15 min, and placing the container in a thermostatic water bath; dropwise adding a sulfuric acid solution having a mass fraction of 3-5 wt % while stirring at low speed of 300 r/min, wherein, a ratio of mass g of the diatomite to volume mL of the sulfuric acid solution is 1:3; then, regulating the rotation speed to 600 r/min, and stirring for 5-6 h; and washing the solution to be neutral with 1 wt % of NaOH solution after cooling, and, drying under a condition of 100-110° C. for 3 h, thereby obtaining the modified diatomite.

Moreover, a preparation method of the modified perlite includes the following steps: preheating and stirring perlite particles at 110° C. for 10 min, wherein a stirring rate is 800 r/min; adding a performance additive ammonium hydroxide accounting for 1-5 wt % of the weight of perlite to regulate a surface potential of the perlite, and promoting bonding between a coupling agent and the surface of the perlite; adding a silane coupling agent accounting for 2 wt % of the weight of the perlite; and performing surface modification at 160-180° C. for 40-50 min, and filtering to obtain modified perlite powder.

Moreover, a preparation method of the modified diatomite is as follows: a polymerization method includes the following steps:

(1) polymerization solution preparation: adding potassium persulfate and polyacrylamide into an acrylic solution having a concentration of 30% in sequence according to a mass ratio, stirring by a high-speed stirrer at a rate of 600 r/min, and adding polyvinyl alcohol within 5 min after dispersing; and performing ultrasonic mixed dispersion for 20 min under ultrasonic power of 300 W so as to obtain a polymerization solution; (2) polymerization reaction: performing ultrafine grinding on the modified diatomite and expanded perlite to 800 meshes, adding the ground powder into the polymerization solution, heating to react under a temperature condition of 50-60° C. for 4-6 h, raising the temperature to 70-80° C., and carrying out a reaction for 2 h so as to obtain a gel-like sandy material; and (3) drying the gel-like sandy material under a high-temperature condition of 110° C. until water content is up to 5-8 wt %, and performing mechanical pulverization to 0.08-2 mm, thereby obtaining final sandy particles.

A multidimensional ecological preservation technology for, sweet potatoes includes the following specific operating steps:

(1) collecting mature tuberous roots in proper time, removing damaged, incomplete and diseased potato pieces, and trimming to remove root hair and vines;

(2) performing BTH soak cleaning to promote callus, wherein a concentration is 100 mg/L, and soaking time is 3-5 min;

(3) callus treatment: performing callus treatment on cleaned sweet potato tubers under ultrasonication of a high temperature of 25-33° C. and high humidity of 90-95% for 2-3 days so as to form wound periderm, wherein ultrasonic power is 100-300 W, and a frequency is 15 kHz;

(4) pretreatment before storage: uniformly spraying a hydrophobic nano silica solution on sweet potato surfaces, wherein a concentration of the solution is 1-4 wt %; and then performing $^{60}Co$ γ ray irradiation on the sweet potatoes at an irradiation dose of 0.1-0.5 kGy;

(5) cellar disinfection: uniformly spraying a potassium permanganate solution having a mass fraction of 1-1.5 wt % on each part of a cellar, and performing synergistic ultrasonication during oxidation, wherein ultrasonic power is 100 W, a frequency is 20-25 kHz, and time is 20-30 min;

(6) sand storage: performing, sand storage when a temperature in the cellar is reduced to 13° C., and laying sand by adopting an interlayer heaping method, wherein sand thickness is appropriate when the sweet potatoes are not seen; covering sandy particles of 5-8 cm thick on the last layer; and uniformly mixing microencapsulated preservation particles in the sandy particles, wherein a ratio of the microencapsulated preservation particles accounting for the sandy material is 5-15 wt %;

(7) tent air-conditioning: building a frame to cover a membrane tent outside sand storage heaps, wherein the membrane tent is a PE film of 0.04-0.06 mm thick, an automatic air-conditioning effect of the sweet potatoes is achieved, and concentrations of $O_2$ and $CO_2$ in the storage environment are respectively maintained in ranges of 7-8% and <10%; and (8) performing secondary $^{60}Co$ γ ray irradiation at an irradiation dose of 0.1-0.5 kGy before storage is ended and the sweet potatoes appear on the market, thereby achieving dual guarantee of storage period and shelf life.

Moreover, a formula of the sandy particles includes the following raw materials in percentage by mass:

| | |
|---|---|
| modified diatomite | 30%-60% |
| modified expanded perlite | 30%-60% |
| polymerizer-acrylic acid | 3%-5% |
| initiator-potassium persulfate | 1%-3% |
| cross-linking agent-polyacrylamide | 1%-3% |
| dispersing agent-polyvinyl alcohol | 0.1-2%%. |

Preparation methods are as follows:

(1) modified diatomite: weighing diatomite in a container, treating the container under microwave power of 300-320 W for 10-15 min, and placing the container in a thermostatic water bath; dropwise adding a sulfuric acid solution having a mass fraction of 3-5 wt % while stirring at low speed of 300 r/min, wherein a ratio of mass g of the diatomite to volume mL of the sulfuric acid solution is 1:3; then, regulating the rotation speed to 600 r/min, and stirring for 5-6 h; and washing the solution to be neutral with 1 wt % of NaOH solution after cooling, and drying under a condition of 100-110° C. for 3 h, thereby obtaining the modified diatomite;

(2) expanded perlite modification: preheating and stirring perlite particles at 110° C. for 10 min, wherein a stirring rate is 800 r/min, adding a performance additive ammonium hydroxide accounting for 1-5 wt % of the weight of perlite to regulate a surface potential of the perlite, and promoting bonding between a coupling agent and the surface of the perlite; adding a silane coupling agent accounting for 2 wt % of the weight of the perlite; and performing surface modification at 160-180° C. for 40-50 min, and filtering to obtain modified perlite powder;

(3) polymerization solution preparation: adding potassium persulfate and polyacrylamide into an acrylic solution having a concentration of 30% in sequence according to a mass ratio, stirring by a high-speed stirrer at a rate of 600 r/min, and adding polyvinyl alcohol within 5 min after dispersing; and performing ultrasonic mixed dispersion for 20 min under ultrasonic power of 300 W so as to obtain a polymerization solution;

(4) polymerization reaction: performing ultrafine grinding on the modified diatomite and expanded perlite to 800 meshes, adding the ground powder into the polymerization solution, heating and reacting under a temperature condition of 50-60° C. for 4-6 h, raising the temperature to 70-80° C., and carrying out a reaction for 2 h so as to obtain a gel-like sandy material; and (5) drying the gel-like sandy material under a high-temperature condition of 110° C. until water content is up to 5-8 wt %, and performing mechanical pulverization to 0.08-2 mm, thereby obtaining final sandy particles.

Moreover, the microencapsulated preservation particles include: 1-3 parts of jasmonic acid methyl ester, 1-3 parts of $CaO_2$, 5-10 parts of beta-cyclodextrin, 5-15 parts of chitosan, 4-8 parts of sodium alginate, 0.3-0.5 part of Tween-80 and 100 pets of sterile water.

Moreover, a preparation method of the microencapsulated preservation particles includes the following steps:

adding the beta-cyclodextrin and sterile water into a triangular flask according to a preset weight ratio, and stirring at a rotation speed of 800-1500 r/min; then, heating to a temperature of 60-80° C. to completely dissolve the beta-cyclodextrin; continuously stirring, and gradually cooling the solution to 35-45° C.; adding the jasmonic acid methyl ester and $CaO_2$ to be uniformly dispersed in the solution; slowly reducing the temperature to room temperature so as to form single-wall double-core beta-cyclodextrin-jasmonic acid methyl ester-$CaO_2$ microcapsules, and adding a second layer of mixed wall material composed of chitosan and sodium alginate on the basis, wherein a weight ratio of the chitosan to sodium alginate is 3:1 to 2:3; treating a homogeneous emulsifier Tween-80 and a mixed solution by a high-shear emulsification instrument for 5-10 min; finally forming double-walled double-core microcapsule preservative emulsion which takes chitosan/sodium alginate and beta-cyclodextrin as the wall material and takes the jasmonic acid methyl ester and $CaO_2$ as the core material; performing suction filtration and washing; and performing vacuum drying at 25° C. for 48 h, thereby obtaining powdered particles.

The present invention has advantages and positive effects as follows:

1. The present invention adopts high temperature callus (BTH soaking capable of promoting the callus effect+ synergistic ultrasonication capable of shortening callus time), the callus time is shortened from the traditional 5-7 days to 2-3 days, and callus formed from the sweet potato tubers may improve own resistance. However, a conventional technology is long in treatment time under high temperature and high humidity conditions. The BTH treatment may accelerate lignin deposition and oxidative cross-linking of the callus in the callus process, thereby promoting the callus effect. Short-time ultrasonic treatment may promote opening of water vapor ports of sweet potato skin, enhance an internal water penetration rate and shorten the callus time; and meanwhile, formation of cork cells is induced, and effective resistance is provided for water loss of the tubers and pathogen infection later.

2. In the present invention, the traditional sand is replaced with the sandy material (having a particle size of 1-3 mm), and the sandy material is lightweight, breathable, and high in water absorbing and retaining property, thermal insulation and heat preservation. The sandy material is excellent in breathability, high in thermal insulation and heat preservation and capable of slowly releasing water and has a repeated water absorption function. A relatively constant temperature and humidity environment of potato heaps is maintained.

3. The present invention adopts bud inhibitor spray+ secondary irradiation treatment, and the sweet potatoes do not sprout or rot. The hydrophobic nano silica is dispersed in the aqueous solution, a layer of organic material is coated on the surface of sweet potatoes when spray is applied to the sweet potatoes, and a network structure is formed, thereby effectively reducing hydrophilic property on the surfaces of the sweet potatoes and obviously inhibiting a germination rate of the sweet potatoes. The sweet potatoes are excellent in stability and are not decomposed when irradiated. $^{60}Co$ γ ray irradiation has no pollution or residue, may directly damage DNA in cells of sweet, potato buds so as to further inhibit germination, has an obvious lethal effect on microorganisms, and can reduce the mildew and rot rate and inhibit the respiratory rate of the sweet potatoes and internal ethylene production. According to secondary irradiation, the sweet potatoes are subjected to irradiation treatment before sand storage and before appearing on the market, and the sweet potatoes will not sprout or rot in the storage period and shelf life. The irradiation dose is 0.1-0.5 kGy.

4. In the present invention, the microencapsulated particles (such as an antifreeze agent, an $O_2$ slow release agent/a $CO_2$ absorbent) are uniformly dispersed in the sandy material; exogenous application of the jasmonic acid methyl ester, that is, the antifreeze agent, may obviously increase, activity of antioxidant enzymes, such as SOD, CAT and the like, in the sweet potato tubers under low-temperature stress, reduce damage of reactive oxygen free radicals to plasma membranes, and decrease cold damage by changing metabolic pathways; and a $CaO_2$-solid oxygen source is long in oxygen release time and uniform in speed when meeting moist air, and produced calcium hydroxide may serve as the $CO_2$ absorbent, thereby synergistically maintaining a gas concentration in the storage environment.

5. The cellar is sterilized and disinfected with ultrasonically synergistic potassium permanganate in the present invention. The potassium permanganate has excellent oxidation and collaborative coagulation effects, and ultrasonic waves acting on the potassium permanganate solution may accelerate the oxidation reaction and enhance sterilization and disinfection effects and are mainly originated from a sound cavitation effect. Tiny nucleuses in liquid are activated under a sound wave effect, sound field energy is concentrated and rapidly released, and shock, growth, retraction and even collapse of the nucleuses may be shown. In addition, ultrasonic energy acts with oxygen in air to produce a strong oxidant $H_2O_2$ or hydroxyl radicals, and due to ultrasonic sterilization, zoogloea is decomposed. Excellent sterilization and disinfection effects may be achieved by the above operations.

DESCRIPTION OF THE DRAWINGS

FIG. 1 is a photo of a sandy material (having a particle size of 0.08-2 mm).

DETAILED DESCRIPTION OF PREFERRED EMBODIMENTS

The present invention will be further described below in detail in combination with drawings and through specific embodiments. The following embodiments are descriptive only, rather than restrictive, and shall not be used to limit the protection scope of the present invention.

A multidimensional ecological preservation technology for sweet potatoes includes the following specific operating steps:

(1) collecting mature tuberous roots in proper time, removing damaged, incomplete and diseased potato pieces, and trimming to remove root hair and vines;

(2) performing BTH soak cleaning to promote callus, wherein a concentration is 100 mg/L, and soaking time is 3-5 min;

(3) callus treatment: performing callus treatment on cleaned sweet potato tubers under ultrasonication of a high temperature of 25-33° C. and high humidity of 90-95% for 2-3 days so as to form wound periderm, wherein ultrasonic power is 100-300 W, and a frequency is 15 kHz;

(4) pretreatment before storage: uniformly spraying a hydrophobic nano silica solution on sweet potato surfaces wherein a concentration of the solution is 1-4 wt %; and then performing $^{60}Co$ γ ray irradiation on the sweet potatoes at an irradiation dose of 0.1-0.5 kGy;

(5) cellar disinfection: uniformly spraying a potassium permanganate solution having a mass fraction of 1-1.5 wt % on each part of a cellar, and performing synergistic ultrasonication during oxidation, wherein ultrasonic power is 100 W, a frequency is 20-25 kHz, and time is 20-30 min;

(6) sand storage: performing sand storage when a temperature in the cellar is reduced to 13° C., and laying sand by adopting an interlayer heaping method, wherein sand thickness is appropriate when the sweet potatoes are not seen; covering sandy particles of 5-8 cm thick on the last layer; and uniformly mixing microencapsulated preservation particles in the sandy particles, wherein a ratio of the microencapsulated preservation particles accounting for the sandy material is 5-15 wt %, and the sandy particles may be repeatedly used;

(7) tent air-conditioning: building a frame to cover a membrane tent outside sand storage heaps, wherein the membrane tent is a PE film of 0.04-0.06 min thick, an automatic air-conditioning effect of the sweet potatoes is achieved, and concentrations of $O_2$ and $CO_2$ in the storage environment are respectively maintained in ranges of 7-8% and <10%; and (8) performing secondary $^{60}Co$ γ ray irradiation at an irradiation dose of 0.1-0.5 kGy before storage is ended and the sweet potatoes appear on the market, thereby achieving dual guarantee of storage period and shelf life.

II. The formula of the used sandy particles includes the following raw materials in percentage by mass:

| | |
|---|---|
| modified diatomite (a main component is silica) | 30-60% |
| modified expanded perlite (lightweight, thermal insulation and heat preservation) | 30-60% |
| polymerizer-acrylic acid (a vinyl monomer having a quite high polymerization speed) | 3-5% |
| initiator-potassium persulfate (promoting polymerization) | 1-3% |
| cross-linking agent-polyacrylamide (increasing gel strength of a high absorbent water-retaining agent) | 1-3% |
| dispersing agent-polyvinyl alcohol | 0.1-2%. |

Preparation methods are as follows:

(1) Diatomite modification: weighing a certain amount of diatomite in a container, treating the container tinder microwave power of 300-320 W for 10-15 min, and then placing the container in a thermostatic water bath; dropwise adding a sulfuric acid solution having a mass fraction of 3-5 wt % while stirring at low speed of 300 r/min wherein a ratio of mass (g) of the diatomite to volume (mL) of the sulfuric acid solution is 1:3; regulating the rotation speed to 600 r/min, and stirring for 5-6 h; and washing the solution to be neutral with 1 wt % of NaOH solution after cooling, and drying under a condition of 100-110° C. for 3 h, thereby obtaining the modified diatomite.

Modification instructions: the diatomite is modified by combining microwaves with acid treatment. On one hand, the microwave treatment may remove partial water in the diatomite, increase porosity and specific surface area of the diatomite and increase an adsorbing effect; and on the other hand, impurities on the surfaces of diatomite particles are removed by virtue of etching of a strong acid, the purity of the diatomite is increased, density of the diatomite is decreased, the diatomite becomes light weight, the pore volume and specific surface area of the diatomite are increased, a pore structure of the diatomite is obviously improved, and adsorptive property of the diatomite is further improved. Through the above modification treatment, the specific surface area is increased by 56%, and the adsorption rate is increased by 41%.

(2) Expanded perlite modification: preheating and stirring perlite particles at 110° C. for 10 mm, wherein a stirring rate is 800 r/min; adding a performance additive ammonium hydroxide (a ratio of ammonium hydroxide to water is 1:2) accounting for 1-5 wt % of the weight of perlite to regulate a surface potential of the perlite, and promoting bonding between a coupling agent and the surface of the perlite; then, adding a silane coupling agent (KH550) accounting for 2 wt % of the weight of the perlite (the silane coupling agent is diluted in advance until a concentration is 50 wt %, and a solvent is absolute ethyl alcohol); and performing surface modification at 160-180° C. for 40-50 min, and filtering to obtain modified perlite powder.

Modification instructions: mass water absorption of the expanded perlite may be up to 4-9 times, while a heat conductivity coefficient of water is 24 times higher than that of air, so that thermal insulation and heat preservation effects of the expanded perlite are seriously influenced. After hydrophobic modification is performed, water may be prevented from entering an inner cavity of the expanded perlite. The silane coupling agent and the perlite micro powder are bonded in the form, of hydrogen bonds and a monomolecular coating which achieves a condensation effect; bonding is firm, and hydrophobic nature is enhanced.

(3) Polymerization solution preparation: adding potassium persulfate and polyacrylamide into an acrylic solution having a concentration of 30% in sequence according to a mass ratio, stirring by a high-speed stirrer at a rate of 600 r/min, and adding polyvinyl alcohol within 5 min after dispersing; and performing ultrasonic mixed dispersion for 20 min under ultrasonic power of 300 W so as to obtain a polymerization solution.

(4) Polymerization reaction: performing ultrafine grinding on the modified diatomite and the expanded perlite to 800 meshes, adding the ground powder into the polymerization solution, heating and reacting under a temperature condition of 50-60° C. for 4-6 h, raising the temperature to 70-80° C., and carrying out a reaction for 2 h so as to obtain a gel-like sandy material.

(5) Drying the gel-like sandy material under a high-temperature condition of 110° C. until water content is up to 5-8 wt %, and performing mechanical pulverization to 0.08-2 mm, thereby obtaining final sandy, particles.

III. A formula of the used microencapsulated preservation particles includes the following components (in parts by weight): 1-3 parts of jasmonic acid methyl ester, 1-3 parts of $CaO_2$, 5-10 parts of beta-cyclodextrin, 5-15 parts of chitosan, 4-8 parts of sodium alginate, 0.3-0.5 part of Tween-80 and 100 parts of sterile water.

The preparation method includes the steps: adding the beta-cyclodextrin and sterile water into a triangular flask according to a preset weight ratio, and stirring at a rotation speed of 800-1500 r/min; then, heating to a temperature of 60-80° C. to completely dissolve the beta-cyclodextrin; continuously stirring, and gradually cooling the solution to 35-45° C.; adding the jasmonic acid methyl ester and $CaO_2$ to be uniformly dispersed in the solution; slowly reducing the temperature to room temperature so as to form single-wall double-core beta-cyclodextrin-jasmonic acid methyl ester-$CaO_2$ microcapsules, and adding a second layer of mixed wall material composed of chitosan and sodium alginate on the basis, wherein a weight ratio of the chitosan to sodium alginate is 3:1 to 2:3; treating a homogeneous emulsifier Tween-80 and a mixed solution by a high-shear emulsification instrument for 5-10 min; finally forming double-walled double-core microcapsule preservative emulsion which takes chitosan/sodium alginate and beta-cyclodextrin as the wall material and takes the jasmonic acid methyl ester and $CaO_2$ as the core material; performing suction filtration and washing; and performing vacuum drying at 25° C. for 48 h, thereby obtaining the powdered particles.

IV. Measured Data

In the present invention, the sandy material is combined with the microencapsulated preservation particles. Efficient rapid callus before storage is matched, and a unique storage manner is matched. By controlling the humidifier, ventilation in the cellar, automatic tent air-conditioning, own thermal insulation and water retention of the sandy material and gas regulation, the conditions are maintained as follows: the storage temperature is 10-14° C., the humidity is 85-90%, the $O_2$ concentration is 7-8%, and the $CO_2$ concentration is less than 10%, so that the sweet potatoes are stored for an extra long time up to 8-10 months, the water retention rate is up to 94-97%, and a healthy fruit rate is up to 95-98%. The sweet potatoes do not sprout during the storage period and after appearing on the market, and are safe and residue-free.

Characteristic Parameters of Sandy Material

| Parameter index | Traditional sand | Sandy material in the present invention | Conclusion |
| --- | --- | --- | --- |
| Density $\rho$ (g/cm$^3$) | 1.6 | 1.3 | Lightweight, density decreased by 18.8% |
| Breathability (5 cm thick) | 55 | 67 | Breathability increased by 21.8% |
| Hydrophobic property (5 cm thick) | Water seeping within 6-8 h | Durable impermeability | Excellent hydrophobic property |
| Water absorption (%) | 9 | 11 | Water absorption increased by 22.2% |
| Porosity (%) | 50 | 53 | Increased by 6% |
| Heat conductivity coefficient (W/m · K) | 0.27 | 0.22 | Thermal insulation property increased by 18.5% |

VI. Other Correlation Descriptions:

(1) BTH is a salicylic acid analogue, that is, a synthetic chemical inducer capable of inducing a plant production system to obtain, resistance. On one hand, the BTH may accelerate lignin deposition in the callus process of the sweet potato tubers so as to promote tissue callus; and on the other hand, the BTH may accelerate oxidative cross-linking of callus by inducing reactive oxygen production and antioxidase activity.

(2) The $CaO_2$ is low in price, and has characteristics of long oxygen release time, uniform release speed and the like. A reaction of the $CaO_2$ in water or moist air is as follows: $2CaO_2 + 2H_2O \rightarrow O_2 + 2Ca(OH)_2 + Q$. Moreover, the produced calcium hydroxide may serve as the $CO_2$ absorbent, thereby maintaining an appropriate gas concentration in the storage environment.

(3) The polyacrylamide is a high water absorbing and retaining agent and has lots of amide and carboxyl hydrophilic groups. By utilizing an osmotic pressure produced by a concentration difference of ions and groups inside the resin and an aqueous solution and affinity between polyelectrolyte and water, a lot of water may be absorbed until the concentration difference disappears. The water retaining agent may absorb pure water that is hundreds of times heavier than the water retaining agent so as to enable the pure water to become hydrogel having a certain mechanical property. The hydrogel after absorbing water may slowly release the water and has a repeated water absorption function. The hydrogel is finally decomposed into carbon dioxide, water and ammonium nitrogen, and no residue exists.

In the present invention, the sweet potatoes are preserved by adopting the following technology for the first time:

Firstly, (1) the traditional sand is replaced with the modified sandy material, and the sandy material is lightweight, breathable, and high in water absorbing and retaining property, thermal insulation and heat preservation; and (2) the sandy material is combined with the microencapsulated preservation particles; efficient, rapid callus before storage is matched; and by controlling the humidifier, ventilation in the cellar, automatic tent air-conditioning, own thermal insulation and water retention of the sandy material and gas regulation, a stable and appropriate storage environment of the sweet potatoes is achieved.

Secondly, (1) the nano silica spray collaborates with the secondary irradiation treatment, so that the sweet potatoes are prevented from sprouting; (2) the prepared microencapsulated antifreeze particles are uniformly dispersed in the sandy material, so that the damage of the reactive oxygen free radicals to plasma membranes is decreased so as to prevent the cold damage; and (3) the automatic tent air-conditioning and the characteristics of the sandy material such as light weight and breathability collaborate with the gas regulation, so that the storage gas conditions are appropriate.

Thirdly, (1) the cellar is disinfected and sterilized with ultrasonically synergistic potassium permanganate, so that the effect is excellent, and the time is short; (2) by virtue of the BTH soaking capable of promoting the callus effect and synergistic ultrasonication capable of shortening the callus time, the sweet potato tubers form the callus so as to increase the own resistance; and (3) the automatic tent air-conditioning and the characteristics of the sandy material such as light weight and breathability collaborate with the gas regulation, so that the storage gas conditions are appropriate.

We claim:

1. A cellar sand storage preservation method for sweet potatoes, comprising the following specific operating steps:
    (1) collecting mature tuberous roots, removing damaged, incomplete and diseased sweet potato pieces, and trimming to remove root hair and vines;
    (2) performing BTH (Benzothiadiazole) soaking and cleaning on sweet potatoes to promote formation of a callus on an outer surface of the sweet potatoes, wherein a concentration is 100 mg/L, and soaking time is 3-5 min;
    (3) performing ultrasonication on cleaned sweet potato potatoes under a high temperature of 25-33° C. and high humidity of 90-95% for 2-3 days so as to form a wound healing periderm, wherein ultrasonic power is 100-300 W, and a frequency is 15 kHz;
    (4) uniformly spraying a hydrophobic nano silica solution on sweet potato surfaces, wherein a concentration of the solution is 1-4 wt %; and then performing $^{60}$Co y ray irradiation on the sweet potatoes at an irradiation dose of 0.1-0.5 kGy;
    (5) uniformly spraying a potassium permanganate solution having a mass fraction of 1-1.5 wt % on each part of a cellar, and performing synergistic ultrasonication during oxidation on the each part of the cellar, wherein ultrasonic power is 100 W, a frequency is 20-25 kHz, and time is 20-30 min;
    (6) alternately laying multiple layers of sweet potatoes and multiple layers of sand when a temperature in the cellar is reduced to 13° C., wherein sand layer thickness is appropriate when the sweet potatoes are not seen; covering sandy particles of 5-8 cm thick on a last layer; and uniformly mixing microencapsulated preservation particles in the sandy particles, wherein a ratio of the microencapsulated preservation particles accounting for the sandy material is 5-15 wt %;
    (7) building a frame to cover with a membrane tent outside sand storage heaps, wherein the membrane tent is a PE (Poly Ethylene) film of 0.04-0.06 mm thick, and concentrations of $O_2$ and $CO_2$ in the storage environment are respectively maintained in ranges of 7-8% and <10%; and
    (8) performing secondary $^{60}$Co y ray irradiation at an irradiation dose of 0.1-0.5 kGy on the sweet potatoes after being removed from the sand.

2. The cellar sand storage preservation method for sweet potatoes according to claim 1, wherein a formula of the sandy particles comprises the following raw materials in percentage by mass:

| | |
|---|---|
| modified diatomite | 30%-60% |
| modified expanded perlite | 30%-60% |
| polymerizer-acrylic acid | 3%-5% |
| Initiator-potassium persulfate | 1%-3% |
| cross-linking agent-polyacrylamide | 1%-3% |
| dispersing agent-polyvinyl alcohol | 0.1-2%% | preparation method of the sandy particles is as follows:
    (1) weighing diatomite in a container, treating the container under microwave power of 300-320 W for 10-15 min, and placing the container in a thermostatic water bath; dropwise adding a sulfuric acid solution having a mass fraction of 3-5 wt % while stirring at low speed of 300 r/min, wherein a ratio of mass g of the diatomite to volume mL of the sulfuric acid solution is 1:3; then, regulating the rotation speed to 600 r/min, and stirring for 5-6 h; and washing the solution to be neutral with 1 wt % of NaOH solution after cooling, and drying under a condition of 100-110° C. for 3 h, thereby obtaining the modified diatomite;
    (2) preheating and stirring perlite particles at 110° C. for 10 min, wherein a stirring rate is 800 r/min; adding a performance additive ammonium hydroxide accounting for 1-5 wt % of the weight of perlite to regulate a surface potential of the perlite, and promoting bonding between a coupling agent and the surface of the perlite; adding a silane coupling agent accounting for 2 wt % of the weight of the perlite; and performing surface modification at 160-180° C. for 40-50 min, and filtering to obtain modified perlite powder;
    (3) adding potassium persulfate and polyacrylamide into an acrylic solution having a concentration of 30% in sequence according to a mass ratio, stirring by a high-speed stirrer at a rate of 600 r/min, and adding polyvinyl alcohol within 5 min after dispersing; and performing, ultrasonic mixed dispersion for 20 min under ultrasonic power of 300 W so as to obtain a polymerization solution;

(4) performing ultrafine grinding on the modified diatomite and expanded perlite to 800 meshes, adding the ground powder into the polymerization solution, heating and reacting under a temperature condition of 50-60° C. for 4-6 h, raising the temperature to 70-80° C., and carrying out a reaction for 2 h so as to obtain a gel-like sandy material; and (5) drying the gel-like sandy material under a high-temperature condition of 110° C. until water content is up to 5-8 wt %, and performing mechanical pulverization to 0.08-2 mm, thereby obtaining final sandy particles.

3. The cellar sand storage preservation method for sweet potatoes according to claim 1, wherein the microencapsulated preservation particles comprise: 1-3 parts of jasmonic acid methyl ester, 1-3 parts of $CaO_2$, 5-10 parts of beta-cyclodextrin, 5-15 parts of chitosan, 4-8 parts of sodium alginate, 0.3-0.5 part of Tween-80 and 100 parts of sterile water.

4. The cellar sand storage preservation method for sweet potatoes according to claim 3, wherein a preparation method of the microencapsulated preservation particles comprises the following steps: adding the beta-cyclodextrin and sterile water into a triangular flask according to a preset weight ratio, and stirring at a rotation speed of 800-1500 r/min; then, heating to a temperature of 60-80° C. to completely dissolve the beta-cyclodextrin; continuously stirring, and gradually cooling the solution to 35-45° C.; adding the jasmonic acid methyl ester and $CaO_2$ to be uniformly dispersed in the solution; slowly reducing the temperature to room temperature so as to form single-wall double-core beta-cyclodextrin-jasmonic acid methyl ester-$CaO_2$ microcapsules, and adding a second layer of mixed wall material composed of chitosan and sodium alginate on the basis, wherein a weight ratio of the chitosan to sodium alginate is 3:1 to 2:3; treating a homogeneous emulsifier Tween-80 and a mixed solution by a high-shear emulsification instrument for 5-10 min; finally forming double-walled double-core microcapsule preservative emulsion which takes chitosan/sodium alginate and beta-cyclodextrin as the wall material and takes the jasmonic acid methyl ester and $CaO_2$ as the core material; performing suction filtration and, washing; and performing vacuum drying at 25° C. for 48 h, thereby obtaining powdered particles.

* * * * *